(12) United States Patent
Minamoto et al.

(10) Patent No.: US 8,017,037 B2
(45) Date of Patent: Sep. 13, 2011

(54) FLUORESCENT SUBSTANCE AND LIGHT EMITTING DEVICE USING THE SAME

(75) Inventors: Maki Minamoto, Tokyo (JP); Koutoku Ohmi, Tottori (JP); Kazuaki Tsuji, Tottori (JP)

(73) Assignees: NEC Lighting, Ltd, Tokyo (JP); Tottori University, Tottori (JP)

( * ) Notice: Subject to any disclaimer, the term of this patent is extended or adjusted under 35 U.S.C. 154(b) by 722 days.

(21) Appl. No.: 12/055,113

(22) Filed: Mar. 25, 2008

(65) Prior Publication Data

US 2009/0051262 A1   Feb. 26, 2009

(30) Foreign Application Priority Data

Mar. 26, 2007  (JP) ................................ 2007-079406

(51) Int. Cl.
*C09K 11/56* (2006.01)
*C09K 11/08* (2006.01)
*C09K 11/54* (2006.01)

(52) U.S. Cl. ........................... 252/301.4 S; 252/301.6 S (58) Field of Classification Search ............ 252/301.4 S, 252/301.6 S
See application file for complete search history.

(56) References Cited

U.S. PATENT DOCUMENTS 3,932,291 A * 1/1976 Donohue ................. 252/62.3 V
2006/0181197 A1   8/2006 Nago et al.

FOREIGN PATENT DOCUMENTS

| JP | 06089075 | 3/1994 |
| JP | 08064361 | 3/1996 |
| JP | 09181345 | 7/1997 |
| JP | 09-279140 | * 10/1997 |
| JP | 2000-091598 | * 3/2000 |

* cited by examiner

*Primary Examiner* — C. Melissa Koslow
*Assistant Examiner* — Matthew E Hoban
(74) *Attorney, Agent, or Firm* — Sughrue Mion, PLLC (57) ABSTRACT

A fluorescent substance capable of remarkably increasing the luminous intensity of a I-III-VI$_2$ chalcopyrite type compound having a large band gap among chalcopyrite type compounds with manganese as luminescence centers, and being favorably used for a lighting device using a light emitting diode, a light emitting element of a display device or the like, a light emitting device such as fluorescent lamps such as a cold cathode fluorescent lamp and a hot cathode fluorescent lamp, as a fluorescent substance generating fluorescence by ultraviolet excitation, is provided. The fluorescent substance is expressed by composition formula (1)

$$Cu(Al_{1-x}Ga_x)(S_{1-y}Se_y)_2:Mn,Si \qquad (1)$$

(wherein x represents a number satisfying $0 \leq x \leq 0.4$, and y represents a number satisfying $0 \leq y \leq 0.4$), including manganese as a luminescence center atom.

4 Claims, 8 Drawing Sheets

FLUORESCENT SUBSTANCE AND LIGHT EMITTING DEVICE USING THE SAME

BACKGROUND OF THE INVENTION

1. Field of the Invention

The present invention relates to a fluorescent substance and a light emitting device using the fluorescent substance, and more particularly, to a fluorescent substance having significantly improved luminous intensity and a light emitting device using the fluorescent substance.

This application is based upon and claims the benefit of priority from Japanese patent application No. 2007-79406, filed on Mar. 26, 2007, the disclosure of which is incorporated herein in its entirely by reference.

2. Description of the Related Art

Various chalcopyrite type compounds are known as isoelectronic compounds with group IV elements. For example, II-VI type compounds and III-V type compounds having zinc blende crystal structure of groups II-VI, III-V and the like are cited. Each of them is composed of two kinds of elements which are opposite side of IV group elements and equidistant from IV group elements in the element periodic table. Further I-III-VI$_2$ type compounds, II-IV-V$_2$ type compounds and the like having copper pyrite crystal structures of I-III-VI$_2$ group, II-IV-V$_2$ group and the like are cited. Each of them is isoelectronic compound with II-VI compounds or III-V compounds. Of I-III-VI$_2$ type compounds and II-IV-V$_2$ type compounds, CuAlS$_2$, CuGaS$_2$ and the like have wide band gaps, and therefore, development of them are proceeding as light emitting materials of solar batteries, light emitting diodes, electroluminescence (EL), and the like.

More specifically, a thin film solar battery (Japanese Patent Laid-Open No. 9-181345) including a metallic electrode layer stacked on an insulating base in contact, a p-type chalcopyrite CuIn(x)Ga(1-x)Se$_2$ semiconductor layer stacked in contact with the metallic electrode layer, a gradient composition layer stacked in contact with the p-type chalcopyrite CuIn(x)Ga(1-x)Se$_2$ semiconductor layer, and a transparent electrode layer stacked in contact with the gradient composition layer is reported.

Further, there is reported a dispersed electroluminescence element (Japanese Patent Laid-Open No. 8-64361) or the like comprising a dielectric layer printed on a back electrode and a light emitting layer printed on the dielectric layer, in which the dielectric layer and the light emitting layer are sandwiched by the back electrode and a transparent conductive film. The light emitting layer is formed by using a printing material containing a dispersion as major proportions obtained by dispersing fluorescent substance powder, in which Mn as a luminescence center material is mixed and doped in CuAlS$_2$, into a certain organic binder, so that red luminescence can be obtained.

However in the dispersed electroluminescence element disclosed in Japanese Patent Laid-Open No. 8-64361, the fluorescent substance contains Mn doped in CuAlS$_2$ as the luminescence center material and various elements such as La, Ce and Pr as further materials, but chalcopyrite type compound containing silicon is never used as photoluminescence.

Further, display devices (Japanese Patent Laid-Open No. 6-89075) including an ultraviolet source which emits ultraviolet light in a plane form, a projection lens placed in a path of the ultraviolet light emitted from the ultraviolet source, and a fluorescent screen including a fluorescent substance layer containing a visible light-emitting fluorescent substance irradiated by the ultraviolet light, and the like are reported. However, in the display device disclosed in Japanese Patent Laid-Open No. 6-89075, CuAlS$_2$ is used only for obtaining the photoluminescence effect of the chalcopyrite type compound or manganese chalcopyrite type compound.

SUMMARY OF THE INVENTION

An object of the present invention is to provide a fluorescent substance which remarkably increases luminous intensity by using a manganese-activated I-III-VI$_2$ chalcopyrite type compound having an especially large band gap among chalcopyrite type compounds and can be favorably used for lighting devices using a light emitting diode or an electroluminescence element, fluorescent lamps such as a cold-cathode fluorescent lamp and a hot electrode fluorescent lamp, and light emitting devices such as a field emission display (FED) and a vacuum fluorescent display (VFD), as a fluorescent substance generating fluorescence.

The present inventors conducted earnest study to increase the luminous intensity of the fluorescent substance of chalcopyrite type compound with manganese as the luminescence center, and as a result, have obtained the knowledge that its luminous intensity is remarkably increased by containing a certain amount of silicon. The present inventors have completed the present invention based on this knowledge.

That is, the present invention relates to a fluorescent substance expressed by composition formula (1)

$$\text{Cu}(\text{Al}_{1-x}\text{Ga}_x)(\text{S}_{1-y}\text{Se}_y)_2:\text{Mn},\text{Si} \quad (1)$$

(where x represents a number satisfying $0 \leq x \leq 0.4$, and y represents a number satisfying $0 \leq y \leq 0.4$), including manganese as a luminescence center atom.

The fluorescent substance of the present invention can remarkably increase luminous intensity by using a manganese-activated I-III-VI$_2$ chalcopyrite type compound having an especially large band gap among chalcopyrite type compounds, and can be favorably used for lighting devices using a light emitting diode or an electroluminescence element, fluorescent lamps such as a cold-cathode fluorescent lamp and a hot electrode fluorescent lamp, and light emitting devices such as a field emission display (FED) and a vacuum fluorescent display (VFD), as a fluorescent substance generating fluorescence.

BRIEF DESCRIPTION OF THE DRAWINGS

FIGS. 3(a) to 3(f) are diagrams showing X-ray diffraction patterns of examples of a fluorescent substance of the present invention;

FIGS. 7(a) to 7(e) are diagrams showing X-ray diffraction patterns of other examples of a fluorescent substance;

FIGS. 11(a) to 11(j) are diagrams showing X-ray diffraction patterns of other examples of a fluorescent substance of the present invention;

DETAILED DESCRIPTION OF THE PREFERRED EMBODIMENTS

A fluorescent substance of the present invention is expressed by composition formula (1)

$$Cu(Al_{1-x}Ga_x)(S_{1-y}Se_y)_2:Mn,Si \quad (1)$$

In the formula, x represents a number satisfying $0 \leq x \leq 0.4$, and y represents a number satisfying $0 \leq y \leq 0.4$.

The fluorescent substance of the present invention comprises chalcopyrite compounds expressed by $Cu(Al_{1-x}Ga_x)(S_{1-y}Se_y)_2$ in composition formula (1). The chalcopyrite type compounds have especially wide band gaps, and emit a longer wavelength lights by the effect of shifting the luminous wavelength of Mn. Among them, $CuAlS_2$, $CuAlSe_2$ and the like can be cited favorably since they enhance the luminous intensity of fluorescence.

The fluorescent substance of the present invention comprises manganese as the luminescence center which activates the above mentioned chalcopyrite type compound. Manganese exists in a fluorescent substance as a complex formed with the above mentioned chalcopyrite type compound, and the fluorescent substance emits broad red fluorescence in the range of 550 to 750 nm, which is considered to be due to 3 d-3 d transition of $Mn^{2+}$ by the excitation light of a wavelength of 250 to 450 nm. As the content of manganese increases, the luminous intensity of the fluorescent substance of the present invention increases, and the wavelength of the luminous peak shifts to a long side. $CuAlS_2$ comprising manganese for example, is excited by light of 365 nm wavelength and emits the fluorescence at the increasing intensity with the increasing content of manganese from 0.1 mol % to 5 mol %, and the wavelength of the fluorescent luminous peak shifts from 595 nm to 629 nm. The manganese content of 0.1 mol % to 20 mol % in the fluorescent substance is preferable, and the manganese content of about 10 mol % in the fluorescent substance is especially preferable since high luminous intensity is provided.

The fluorescent substance of the present invention contains silicon and selenium. Silicon and selenium have a flux effect for a fluorescent substance. The flux effect is the function of being capable of promoting fusion of manganese and chalcopyrite type compounds, decreasing crystal faults, suppressing generation of phonon due to excitation light, and promoting emission of manganese. The flux effect is the effect of influencing the fluorescent luminous intensity and fluorescent luminous wavelength of manganese-activated chalcopyrite type compounds. It is considered that emission of broad red fluorescence in the range of 550 to 750 nm due to 3 d-3 d transition of $Mn^{2+}$ is promoted because of containing these elements. For example, in the case of using $CuAlS_2$ as a chalcopyrite type compound, when the content of silicon in the fluorescent substance is low, the luminous intensity of the fluorescent substance exited by 365 nm light becomes lower than when silicon is not contained. As the content of silicon in the fluorescent substance increases from 1 mol % to 10 mol %, the luminous intensity of the fluorescent substance increases, and it becomes the maximum in the vicinity of 10 mol %. If the content of silicon increases more than this, the luminous intensity of the fluorescent substance decreases. Further, until the content of silicon is in the vicinity of 10 mol %, the wavelength of luminous peak of the fluorescent substance shifts to a long wavelength side as the content of silicon increases. When the content of silicon in the fluorescent substance is the in vicinity of 20 mol %, the luminous peak of the fluorescent substance seems to tend to shift to a short wavelength side gradually. The silicon content of 1 mol % to 50 mol % in the fluorescent substance is preferable, the silicon content of 5 mol % to 30 mol % is more preferable, and the silicon content of about 20 mol % is especially preferable because high luminous intensity of the fluorescent substance is provided.

A method of the preparation of the above mentioned fluorescent substance can be cited combining the respective elements to obtain the composition of the intended fluorescent substance, dissolving and cooling them. As raw materials, $Cu_2S$, $Al_2S_3$, $Ga_2S_3$, $Al_2Se_3$, $Ga_2Se_3$, MnS, MnSe, Si, Se and the like are used so that Cu, Al, Ga, Mn, Si and Se are in the mol ratio corresponding to the intended composition, to which sulfur is further added, and are baked. As the baking conditions, for example, 1000° C., one hour and the like can be set.

A light emitting device of the present invention may be any device as long as it uses the above mentioned fluorescent substance. As the light emitting device of the present invention, a light emitting element such as a light emitting diode having a semiconductor which emits light of a wavelength of 250 to 450 nm, an electroluminescence element, fluorescent lamps such as a cold cathode fluorescent lamp and hot electrode fluorescent lamp using ultraviolet rays emitted from mercury as excitation light, a field emission display (FED), a vacuum fluorescent display (VFD) and the like. The FED and the VFD cause electrons from a cathode to collide directly against fluorescent substances and emit light, As one example of the light emitting device of the present invention, a light emitting diode shown in FIG. 1 can be cited. In the light emitting diode shown in FIG. 1, an ultraviolet diode 5 which emits ultraviolet ray of 250 nm to 450 nm is provided inside a transparent resin 3 formed into a dome shape on a transparent substrate 1. Wrought mirror may be applied to the surface of the transparent resin so that it acts as a mirror. The red emitting fluorescent substance 2 is contained in the transparent resin 3.

Figure 1:
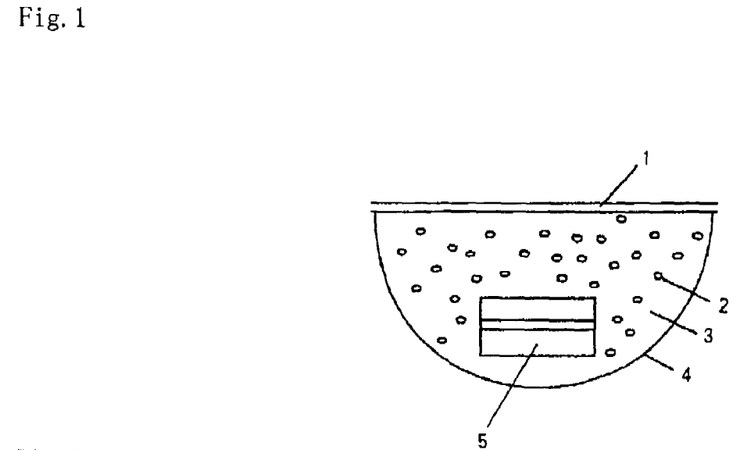
FIG. 1 is a view showing a schematic view of a light emitting diode element as one example of a light emitting device of the present invention.

When a voltage is applied to the ultraviolet diode 5 through wiring not illustrated, the fluorescent substance 2 is excited by the ultraviolet ray from the ultraviolet diode, and red fluorescence of 550 nm to 750 nm is emitted from the fluorescent substance.

Further, green light emitting fluorescent substance and blue light emitting fluorescent substance by the excitation light of 250 nm to 450 nm can be set in the transparent resin together with the red light emitting fluorescent substance 2 to achieve color rendering with the fluorescence from the fluorescent substance 2, and a white light emitting element can be provided. As an ultraviolet diode, GaN emitting near ultraviolet light can be cited as an example. As a blue light emitting fluorescent substance, $(Ba,Sr,Ca,Mg)_{10}(PO_4)_5Cl_2:Eu^{2+}$, $BaMgAl_{10}O_{17}:Eu^{2+}$ and the like can be cited. As a green light emitting fluorescent substance, ZnS:Cu,Al, $BaMgAl_{10}O_{17}$:Eu,Mn and the like can be cited.

As one example of the light emitting device of the present invention, a cold cathode fluorescent lamp for a backlight of a liquid crystal panel can be cited. As shown in a schematic sectional view of FIG. 2, a cold cathode fluorescent lamp 21 is constituted by hermetically sealing both ends of a transparent tube 22 of glass or the like with sealing members 23 of bead glass or the like. The outside diameter of the transparent tube 22 is within the range of 1.5 to 6.0 mm, preferably within the range of 1.5 to 5.0 mm. A fluorescent substance layer 24 containing the above mentioned fluorescent substance is provided over a substantially entire inner wall surface of the transparent tube. Predetermined amounts of rare gas and mercury are introduced into an internal space 25 of the transparent tube, and the internal space is decompressed to about one several tenths of the atmospheric pressure. A cup-shaped electrode 27 is placed at near the both ends of the transparent tube, so that opening 20 is opposed to each other. One end of each of lead wires 29 is welded to a bottom surface portion of the electrode 27, and the other end of it is led outside the transparent tube through the sealing member 23. Further, a protection layer which protects the transparent tube against mercury and the ionized rare gas may be provided.

Figure 2:
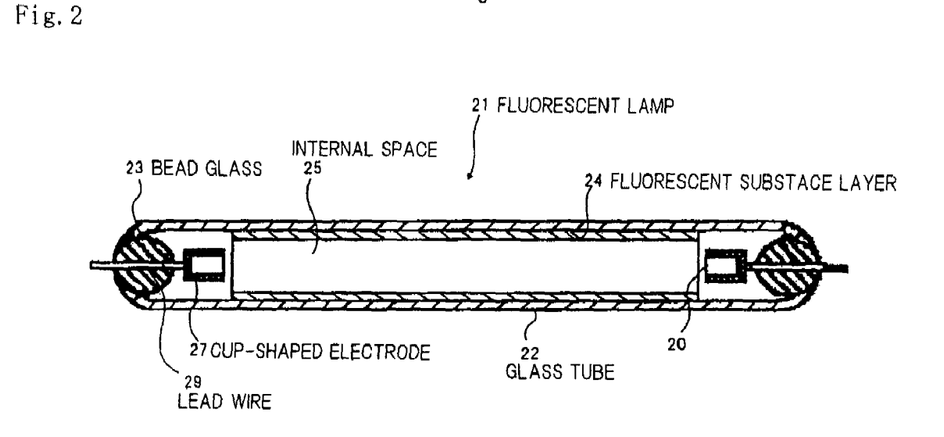
FIG. 2 is a view showing a schematic sectional view of a fluorescent lamp as one example of the light emitting device of the present invention.

When a voltage is applied between the electrodes in such a cold cathode fluorescent lamp, the rare gas is ionized by a little electrons existing in the transparent tube, and the ionized rare gas is caused to collide against the electrode to discharge secondary electrons to cause a glow discharge. Thereby, the mercury is excited by the glow discharge to irradiate ultraviolet rays of 253.7 nm, 360 nm and the like, and red fluorescence is emitted from the fluorescent substance contained in the fluorescent substance layer which is provided on the inner wall of the transparent tube due to being excited by the ultraviolet rays. The fluorescent substance layer may contain blue emitting fluorescent substance and green emitting fluorescent substance excited by the ultraviolet rays irradiated from the mercury, and white light may be emitted by the color rendering effect. As the blue emitting fluorescent substances or green emitting fluorescent substances, fluorescent substances similar to those cited as examples for the above mentioned light emitting diode can be cited.

As one example of the light emitting device of the present invention, a field emission display (FED) device can be cited. As shown in a partial schematic sectional view of FIG. 14, the FED device comprises a set of anode substrate 31 and a cathode substrate 32 of glass or the like, and they are disposed parallel each other by a support frame not illustrated to hold a space of several mm or less between them and a vacuum inside. The anode substrate 31 is provided with fluorescent substances 31b on its inner surface via a transparent anode electrode 31a. The fluorescent substances 31b are formed by alternately given the respective pixels containing the above mentioned red emitting fluorescent substance, blue emitting fluorescent substance and green emitting fluorescent substance. Light absorbers made of a black conductive material may be provided between the respective pixels of the respective fluorescent substances to separate from each other.

Figure 14:
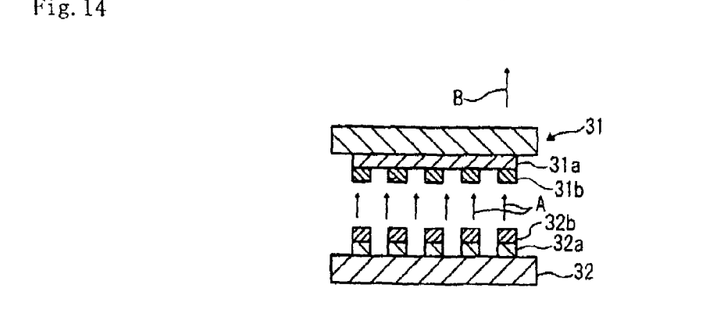
FIG. 14 is a view showing a schematic sectional view of a field emission display device as one example of a light emitting device of the present invention.

Meanwhile, electron emitting elements (emitters) 32b made of a carbon film or the like are provided on the inner surface of the cathode substrate 32 via a cathode electrode 32a to correspond to the pixels of the respective fluorescent substances. A voltage is applied to the respective electron emitting elements, by wiring not shown provided with cathode substrate, connected to signal input terminals (not illustrated) provided with the support frame.

In such an FED device, when a voltage is applied to the cathode electrode 32a and the anode electrode 31a, electrons are emitted from the electron emitting elements 32b, and the emitted electrons are attracted by the anode electrode 31a as shown by the arrows A, collide with the fluorescent substances 31b and excite the fluorescent substances. The excited fluorescent substances emit fluorescence. The fluorescences emitted from each of the fluorescent substances mix to be white light and are emitted outside from the anode substrate 31 as shown by the arrow B. By using the above mentioned fluorescent substances, luminance can be raised, and further by using the conductive fluorescent substances, electrical charging of the fluorescent substances due to collision of excessive electrons emitted from the emitters can be suppressed. Therefore, the depression of collision of the fluorescent substances against electrons due to the electrically charging surfaces of fluorescent substances can be avoided, and abnormal discharge between electrons which are cut off from escape and the emitters can be suppressed.

As one example of the light emitting device of the present invention, a vacuum fluorescent display (VFD) device can be cited. As the VFD device of this kind, the one shown in a partial schematic sectional view of FIG. 15 can be cited. In the VFD device shown in FIG. 15, anodes 45 are respectively connected to the respective wirings 42 provided on a substrate 41 of glass or the like. The wiring 4 is formed by making through-hole 44 through an insulator layer 43. Fluorescent substance layers 46a, 46b and 46c are formed on the respective anodes. The fluorescent substance layers 46a, 46b and 46c respectively contain the above described red emitting fluorescent substance, a blue emitting fluorescent substance, a green emitting fluorescent substance and the like, and they are alternately provided. A grid 47 is provided above the fluorescent substance layers to cover them and to be electrically connected to a terminal not illustrated which is provided on the substrate. Further, a filament-shaped cathode 48 is provided above the grid by being hung across braces provided at both ends of the substrate, and these are provided inside a container 49 forming a vacuum space.

Figure 15:
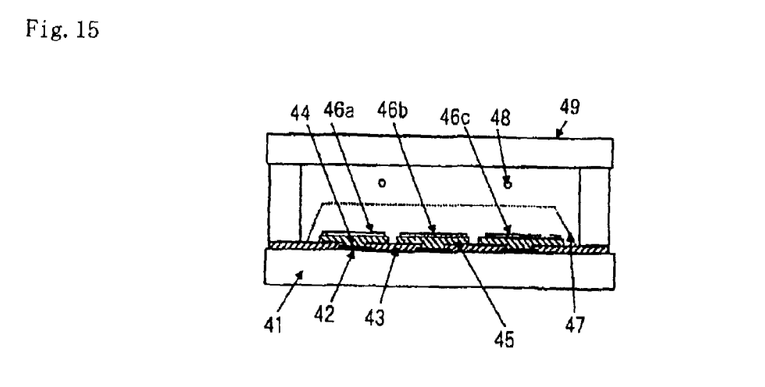
FIG. 15 is a view showing a schematic sectional view of a vacuum fluorescent display device as one example of a light emitting device of the present invention.

In such a vacuum fluorescent display device, display is performed by exciting the fluorescent substances by applying electrons from the cathode to the fluorescent substances and causing the fluorescent substances to emit fluorescence. By containing the above mentioned fluorescent substances, the vacuum fluorescent display device can increase luminance, have less fluctuation luminous intensity due to ambient temperature, especially a low temperature, suppress abnormal discharge by conductivity of the fluorescent substances, and generate constant fluorescence continuously.

Hereinafter, the fluorescent substance of the present invention will be described in more detail by citing exemplary embodiments.

Exemplary Embodiment 1

$CuAlS_2$:Mn, Si fluorescent substance were produced.
As raw materials, $Cu_2S$, $Al_2S_3$, MnS, Si and S were used, and baking was performed in an Ar atmosphere at 1000° C.

for one hour. The content of Mn in the raw materials was set at 5 mol %, the content of Si in the raw materials was changed to 1 mol % (Exemplary Embodiment 1-1), 5 mol % (Exemplary Embodiments 1-2), 10 mol % (Exemplary Embodiments 1-3), and 20 mol % (Exemplary Embodiments 1-4), and the $CuAlS_2$:Mn, Si fluorescent substance samples were obtained.

As comparative example 1, a $CuAlS_2$:Mn fluorescent substance (comparative example 1) was produced as in Exemplary Embodiment 1 except that Si was not added.

X-ray diffraction (XRD) measurement, photoluminescence (PL) measurement, photoluminescence excitation (PLE) measurement were performed for the obtained $CuAlS_2$:Mn, Si fluorescent substance samples.

[X-ray Diffraction Measurement]

Figure 3:
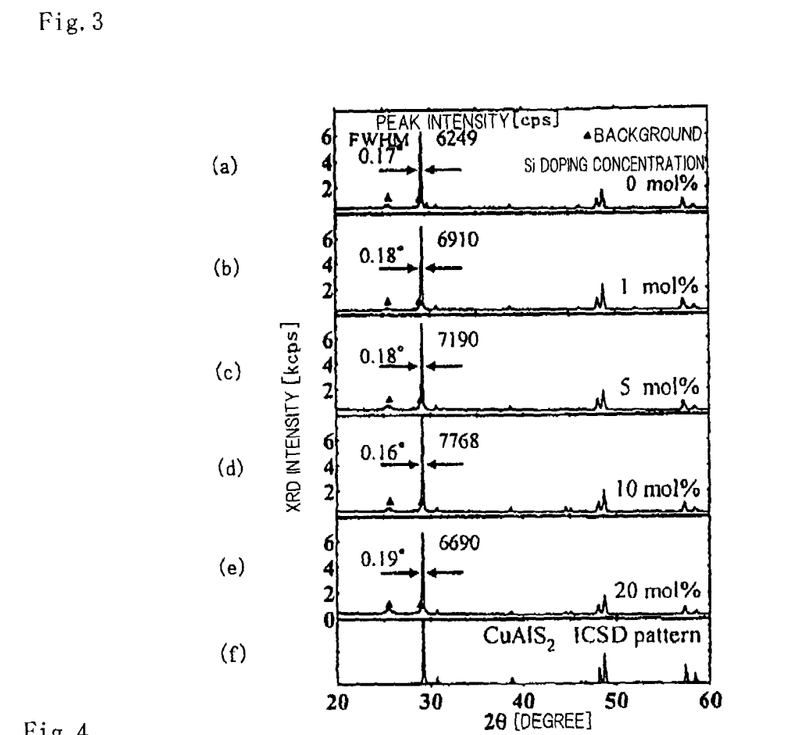

The X-ray diffraction measurement was performed under an air atmosphere at a room temperature. The X-ray diffraction patterns of the obtained samples are shown in FIGS. 3(a) to 3(f). FIG. 3(a) shows the pattern when the content of Si is 0 mol % (comparative example 1), FIG. 3(b) shows the pattern when the content of Si is 1 mol % (Exemplary Embodiment 1-1), FIG. 3(c) shows the pattern when the content of Si is 5 mol % (Exemplary Embodiment 1-2), FIG. 3(d) shows the pattern when the content of Si is 10 mol % (Exemplary Embodiment 1-3), FIG. 3(e) shows the pattern when the content of Si is 20 mol % (Exemplary Embodiment 1-4), and FIG. 3(f) shows the pattern of $CuAlS_2$ described in ICSD (Inorganic Crystal Structure Database). Since all the samples differing in the above mentioned Si content have the patterns corresponding to the pattern of ICSD, the existence of $CuAlS_2$:Mn, Si fluorescent substance was able to be confirmed.

In the X-ray diffraction pattern of the comparative example, the main peak in the vicinity of 29° had a diffraction intensity of 6249 cps, and the half value width was 0.17°. In Exemplary Embodiments 1-1 to 1-4, the main peak intensities increased as compared with the comparative example, and in Si of 10 mol % (Exemplary Embodiment 1-3), the main peak intensity became the maximum whereas the half value width became the minimum. Therefore, it is obvious that the generation amount of crystalline $CuAlS_2$ becomes the maximum in the vicinity of 10 mol % of the Si content. As for the Si content exceeding 10 mol %, an impurity peak is seen in the vicinity of 45°.

[PL Measurement]

Figure 4:
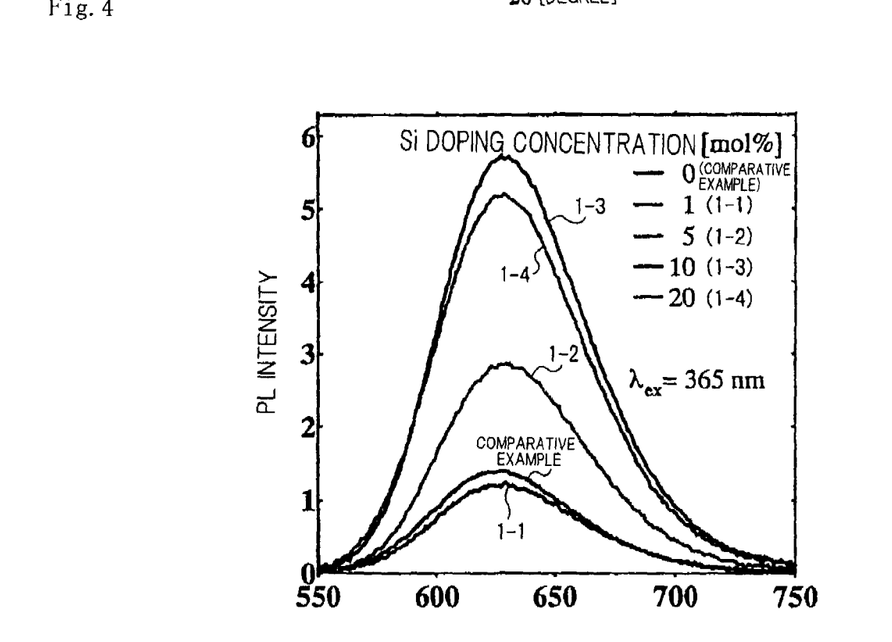
FIG. 4 is a diagram showing a PL intensity of each of the examples of the fluorescent substance of the present invention.

The PL measurement of the samples was performed under an air atmosphere at a room temperature by using excitation light of 365 nm. The PL intensities of the samples obtained are shown in FIG. 4. In Exemplary Embodiments 1-1 to 1-4 and the comparative example, broad red emissions considered to be due to 3 d-3 d transition of $Mn^{2+}$ were confirmed.

In the comparative example in which Si was not contained, the luminous peak wavelength in the PL measurement was 625 nm, and when Si was contained, the luminous intensity increased, and the luminous peak shifted to the long wavelength side. In the sample of the Si content of 10 mol % (Exemplary Embodiment 1-3), the luminous intensity and the shift of the luminous peak to the long wavelength side became the maximum. Further, the content of Si of 20 mol % (Exemplary Embodiment 14), the luminous intensity reduced, while the shift of the luminous peak to the long wavelength side was reduced. It is conceivable that in the sample of the Si content of 10 mol % in the vicinity, the flux effect by Si and the activated effect by Mn increase, and thereby, the luminous intensity increases. As the reason of shift of the luminous peak to the long wavelength side, change in the crystal field around Mn and the like are conceivable.

[PLE Measurement]

Figure 5:
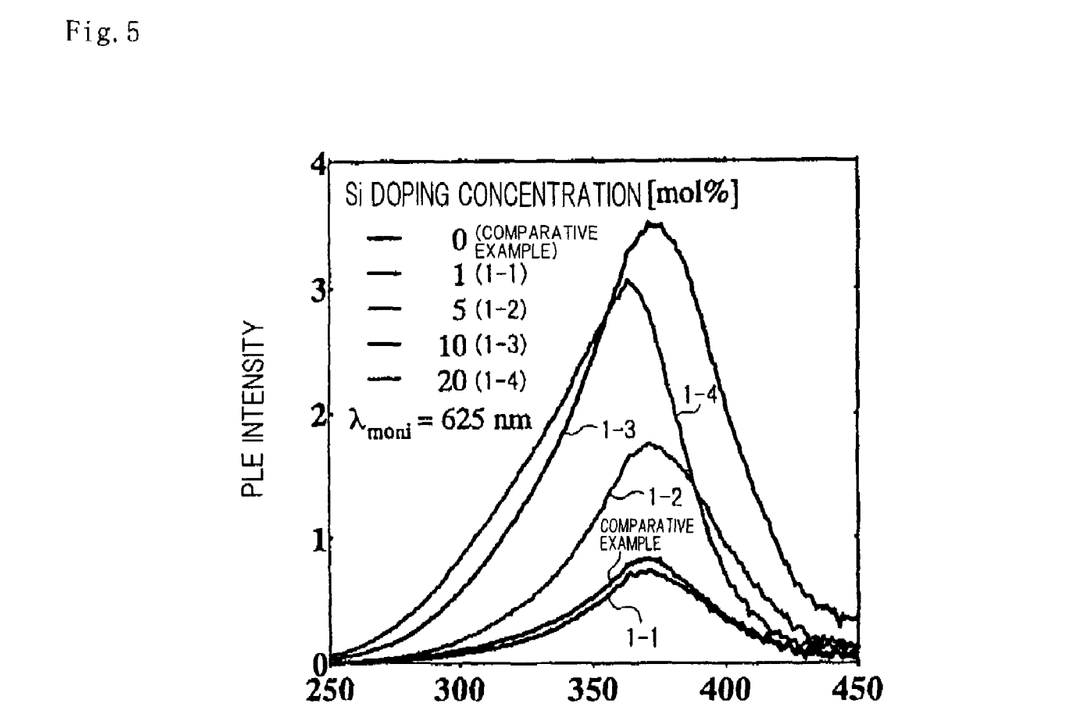
FIG. 5 is a diagram showing a PLE intensity of each of the examples of the fluorescent substance of the present invention.

The PLE measurement of the samples was performed under an air atmosphere at a room temperature by changing the excitation light wavelength, and monitoring the emission of light of 625 nm from the samples. The PLE intensities for the excitation light wavelength are shown in FIG. 5.

In the comparative example in which Si was not contained, the peak wavelength of the excitation light in the PEL measurement is 370 nm. As the content of Si increases, the peak wavelength of the excitation light shifts to a long wavelength side, and the luminous intensity of 625 nm increases. When the content of Si is 10 mol % (Exemplary Embodiment 1-3), the luminous intensity of 625 nm becomes the maximum, and the shift of the peak wavelength of the excitation light to the long wavelength side becomes 375 nm which is the maximum. However, when the content of Si is further increased to be 20 mol % (Exemplary Embodiment 1-4), the luminous intensity of 625 nm reduces, and the shift of the peak wavelength of the excitation light to the long wavelength side is suppressed. It is conceivable that since the band gap of $CuAlS_2$ is 354 nm, change in the content of Si influences the shift of the wavelength of the excitation light and influences the excitation band of the $Mn^{2+}$ luminescence center directly.

[Measurement of Radiation Transition Probability]

Figure 6:
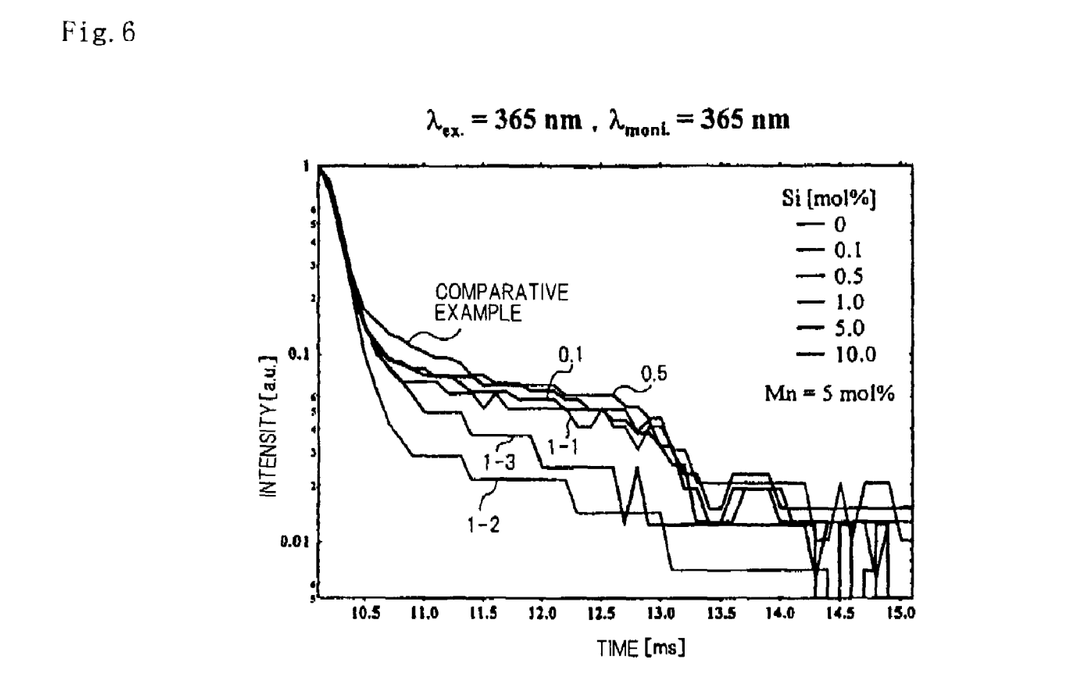
FIG. 6 is a diagram showing an emission decay curve of each of the examples of the fluorescent substance of the present invention.

The samples were irradiated with excitation light of 365 nm under an air atmosphere at a room temperature, and afterglow times of emissions of the wavelength of 365 nm from the samples were measured. The emission decay curve is shown in FIG. 6.

Exemplary Embodiment 2

Samples of $CuAlS_2$:Mn, Si fluorescent substance were produced as in Exemplary Embodiment 1 except that the content of Si in the raw materials was set at 10% mol, the content of Mn in the raw materials was changed to 0.1 mol % (Exemplary Embodiment 2-1), 0.5 mol % (Exemplary Embodiment 2-2), 1.0 mol % (Exemplary Embodiment 2-3), 5.0 mol % (Exemplary Embodiment 2-4), 7.5 mol % (Exemplary Embodiment 2-5), 10.0 mol % (Exemplary Embodiment 2-6) and 15.0 mol % (Exemplary Embodiment 2-7).

X-ray diffraction (XRD) measurement, PL measurement, PL excitation measurement, and radiation transition probability measurement were performed for the obtained $CuAlS_2$:Mn, Si fluorescent substance samples as in Exemplary Embodiment 1.

[X-Ray Diffraction Measurement]

Figure 7:
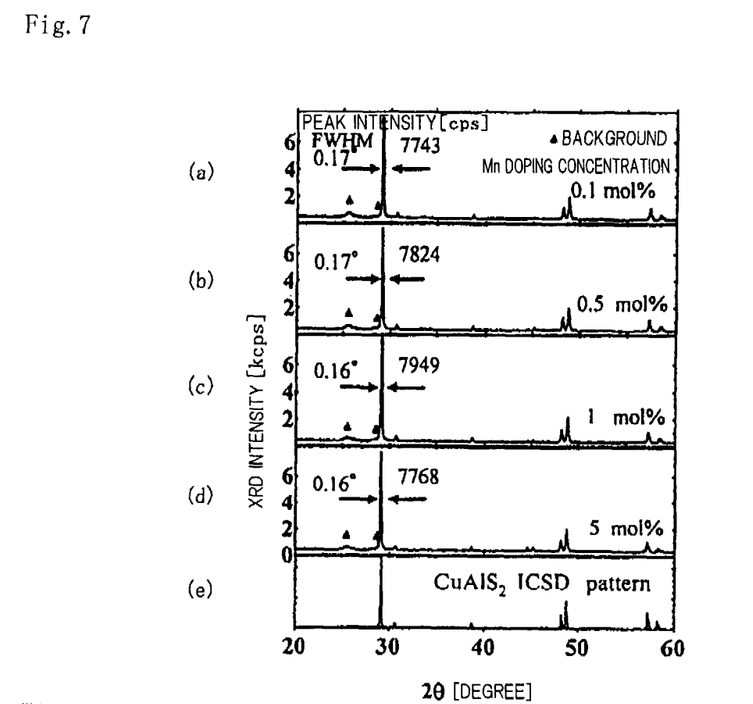

The obtained X-ray diffraction patterns are shown in FIGS. 7(a) to 7(e). FIG. 7(a) shows the pattern of $CuAlS_2$ when the content of Mn is 0.1 mol % (Exemplary Embodiment 2-1), FIG. 7(b) shows the pattern when the content of Mn is 0.5 mol % (Exemplary Embodiment 2-2), FIG. 7(c) shows the pattern when the content of Mn is 1.0 mol % (Exemplary Embodiment 2-3), FIG. 7(d) shows the pattern when the content of Mn is 5.0 mol % (Exemplary Embodiment 24) and FIG. 7(e) shows the pattern of $CuAlS_2$ described in the ICSD. All the samples differing in the above described content have the patterns corresponding to the pattern of the ICSD, and therefore, existence of $CuAlS_2$:Mn, Si fluorescent substance was able to be confirmed.

In the X-ray diffraction patterns of Exemplary Embodiments 2-1 to 2-7, a large difference cannot be seen in the half value widths and diffraction intensities of the main peaks with the change in Mn content, and it is conceivable that Mn does not have anything to do with improvement in crystallinity and increase in peak intensity in the samples.

[PL Measurement]

Figure 8:
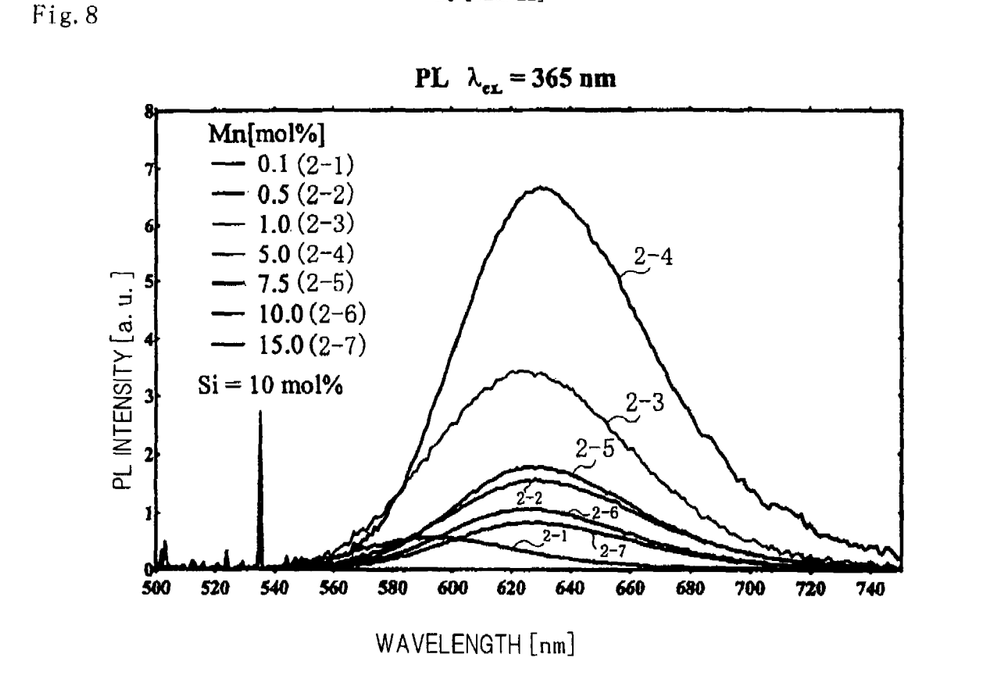
FIG. 8 is a diagram showing a PL intensity of each of the other examples of the fluorescent substance of the present invention.

The obtained PL intensities are shown in FIG. 8. In FIG. 8, in Exemplary Embodiments 2-1 to 2-7, broad red emissions considered to be due to 3 d-3 d transition of $Mn^{2+}$ are confirmed.

The luminous peak wavelength in the PL measurement of the fluorescent substance with the Mn content of 0.1 mol % (Exemplary Embodiment 2-1) is 595 nm. As the content of Mn in the fluorescent substance increases close to 5.0 mol %, luminous intensity increases, and the wavelength of luminous peak shifts to the long wavelength side. The sample with the Mn content of 5.0 mol % (Exemplary Embodiment 2-4) has the maximum wavelength of 629 nm in which the luminous intensity and the shift of the wavelength of luminous peak to the long wavelength side are maximum. Further, as the content of Mn increases to 7.5 mol % (Exemplary Embodiment 2-5), 10.0 mol % (Exemplary Embodiment 2-6), and 15.0 mol % (Exemplary Embodiment 2-7), the luminous intensity of the fluorescent substance gradually reduces. The shift of the luminous peak to the long wavelength side is also reduced.

[PLE Measurement]

Figure 9:
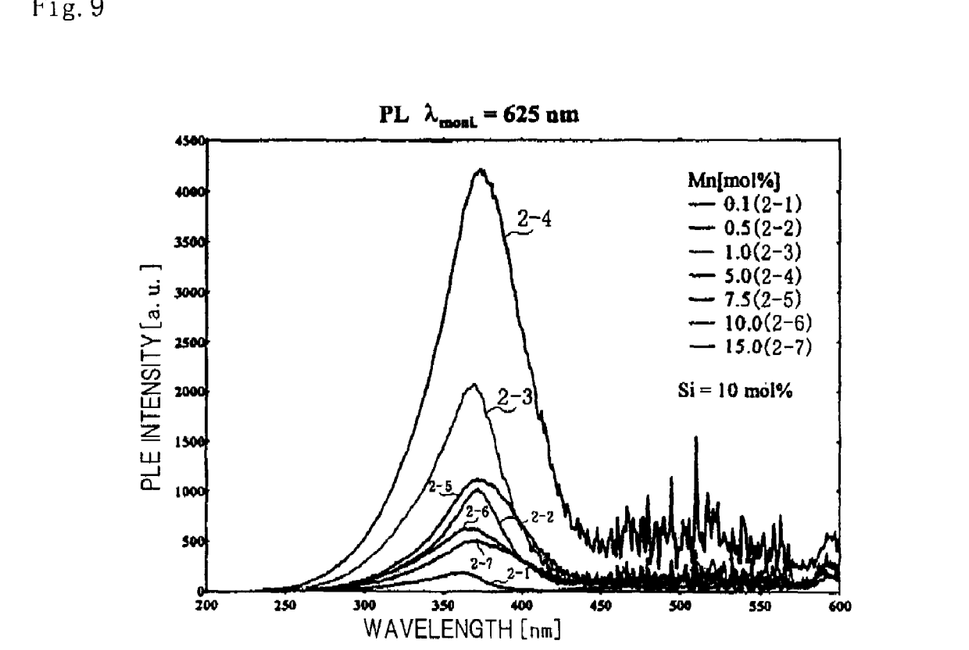
FIG. 9 is a diagram showing a PLE intensity of each of the other examples of the fluorescent substance of the present invention.

The PLE intensities with respect to the excitation light wavelength are shown in FIG. 9.

The peak wavelength of the excitation light in the PLE measurement is 364 nm when the content of Mn is 0.1 mol % (Exemplary Embodiment 2-1). As the content of Mn increases, the peak wavelength shifts to the long wavelength side, and the luminous intensity of 625 nm also increases. The shift to the long wavelength side becomes the maximum when the Mn content is 5.0 mol % (Exemplary Embodiment 2-4). The excitation peak wavelength at this time is 375 nm, and as the content of Mn increases to 7.5 mol % (Exemplary Embodiment 2-5), 10.0 mol % (Exemplary Embodiment 2-6), and 15.0 mol % (Exemplary Embodiment 2-7), the excitation peak wavelength gradually shifts to the short wavelength side.

[Measurement of Radiation Transition Probability]

Figure 10:
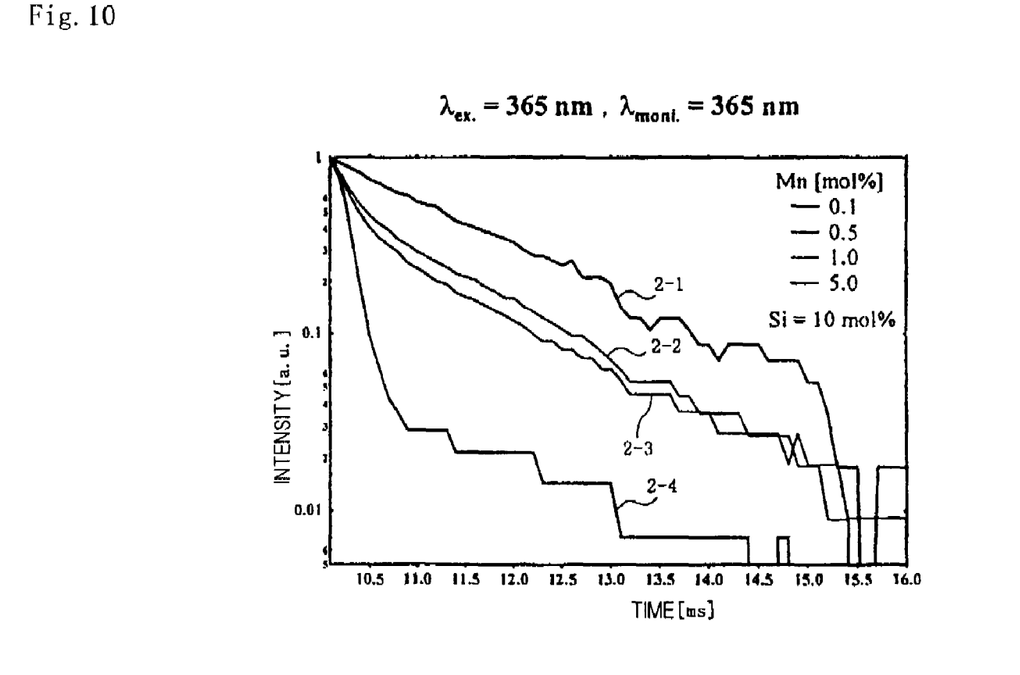
FIG. 10 is a diagram showing an emission decay curve of each of the examples of the fluorescent substance of the present invention.
Figure 11:
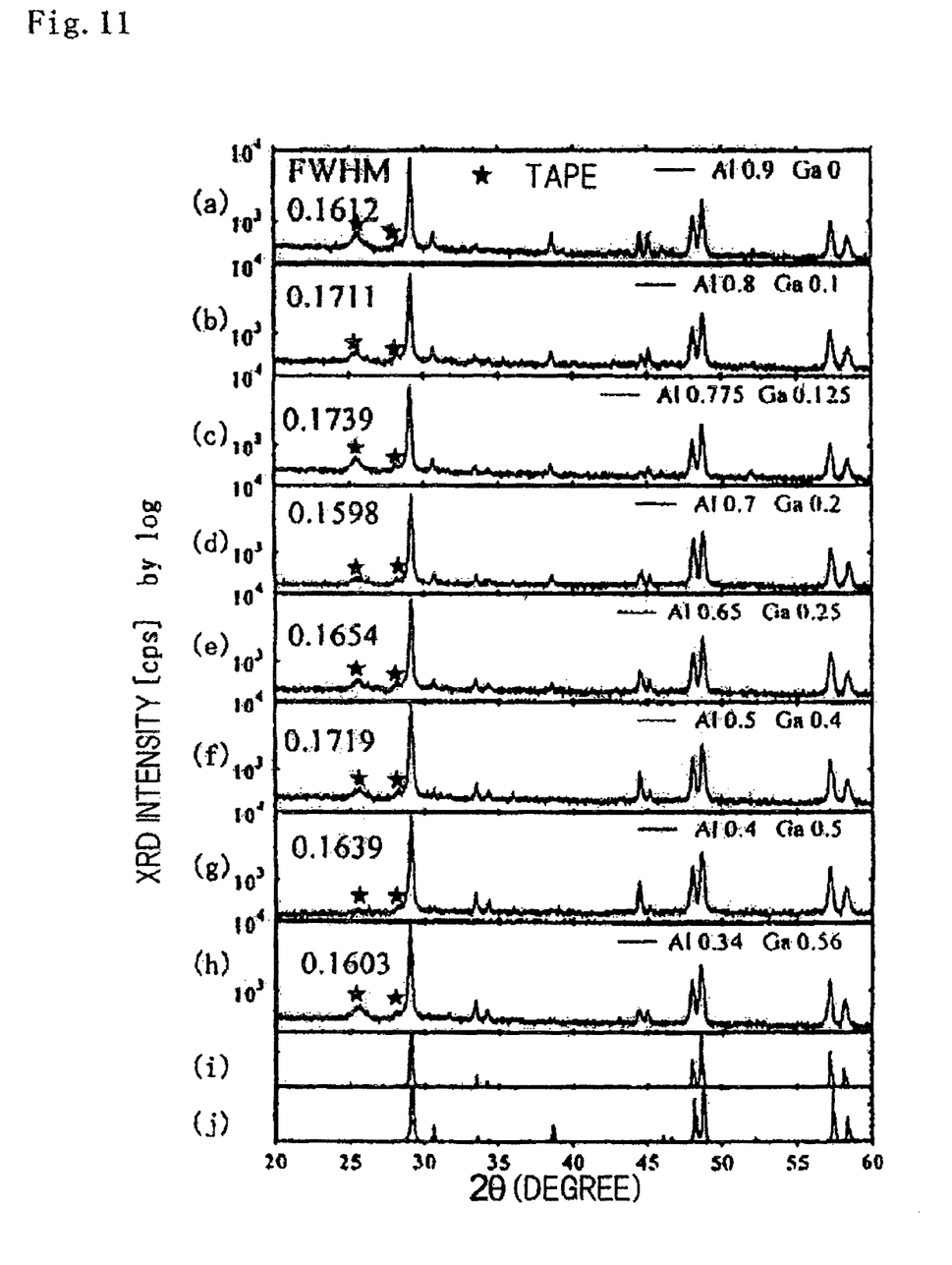

The samples were irradiated with excitation light of 365 nm under an air atmosphere at a room temperature, and the afterglow times of the emissions of 365 nm from the samples were measured. The emission decay curves are shown in FIG. 10.

Exemplary Embodiment 3

In the composition formula $CuAl_{0.9-x}Ga_xSi_{0.1}S_2:Mn_{0.05}$, the fluorescent substances of x=0, 0.1, 0.125, 0.2, 0.25, 0.4, 0.5, and 0.56 (Exemplary Embodiments 3-1 to 3-8) were produced. As raw materials, $Cu_2S$, $Al_2S_3$, $Ga_2S_3$, MnS, Si and S were used, baking was performed at 1000° C. under an Ar atmosphere for one hour, and the fluorescent substance samples were obtained.

X-ray diffraction (XRD) measurement, PL measurement and PL excitation measurement were performed for the obtained $CuAl_{0.9-x}Ga_xSi_{0.1}S_2:Mn_{0.05}$ fluorescent substance samples as in Exemplary Embodiment 1.

[X-ray Diffraction Measurement]

FIGS. 11(a) to 11(h) show the X-ray diffraction patterns of Exemplary Embodiments 3-1 to 3-8. FIG. 11(i) shows the pattern of $CuGaS_2$, and FIG. 11(j) shows the pattern of $CuAlS_2$. Since all the samples differing in the above mentioned Al and Ga contents have the patterns which closely resemble the pattern of the ICSD, existence of $CuAl_{0.9-x}Ga_xSi_{0.1}S_2:Mn_{0.05}$ fluorescent substance was able to be confirmed.

[PL Measurement]

Figure 12:
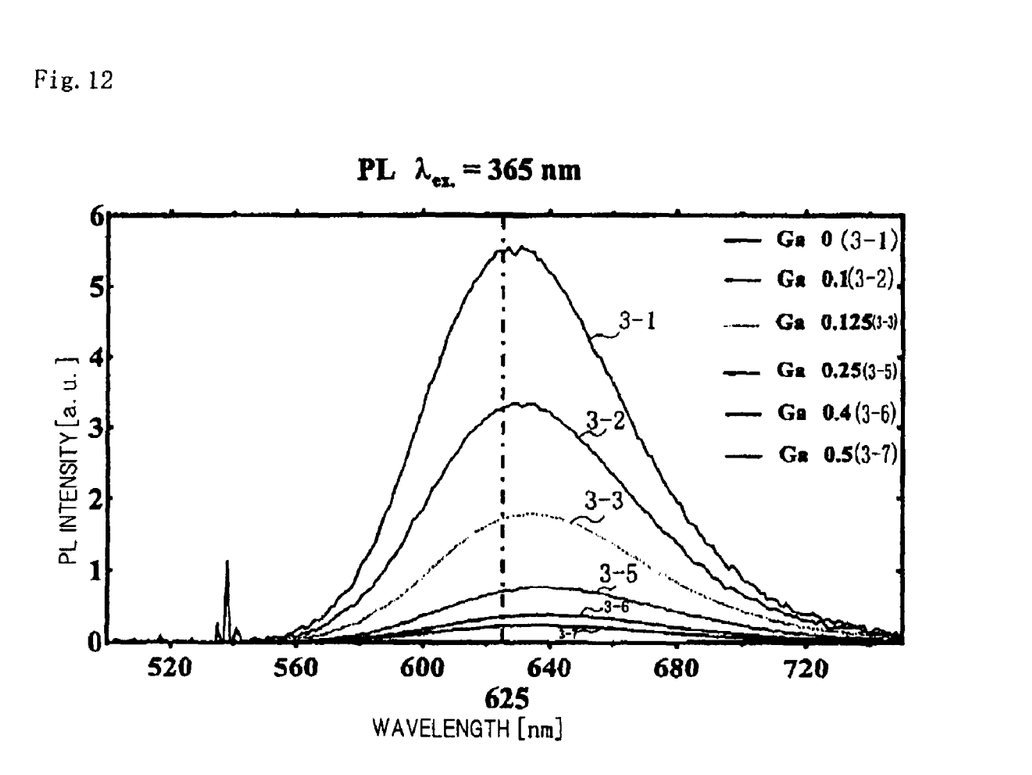
FIG. 12 is a diagram showing a PL intensity of each of the other examples of the fluorescent substance of the present invention.

The PL intensities of the samples of Exemplary Embodiments 3-1 to 3-3 are shown in FIG. 12 when the light of the wavelength of 365 nm was used as excitation light for the samples. Broad red emissions considered to be due to 3 d-3 d transition of $Mn^{2-}$ of the fluorescent substances of the samples were confirmed as shown in FIG. 12.

The luminous peak wavelength in the PL measurement shifts to the long wavelength side from the luminous peak wavelength of 625 nm of $CuAlS_2$:Mn. The luminous intensity reduces as the content of Ga increases, but the shift of the luminous peak to the long wavelength side increases.

[PLE Measurement]

Figure 13:
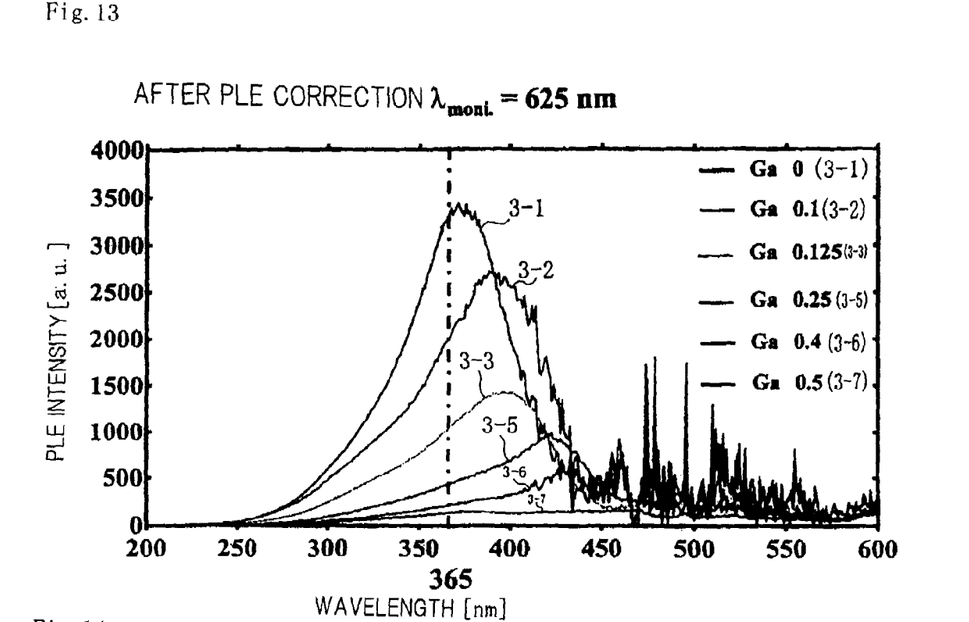
FIG. 13 is a diagram showing a PLE intensity of each of the other examples of the fluorescent substance of the present invention.

The PLE intensities of the samples of Exemplary Embodiments 3-1 to 3-3 and 3-5 to 3-7 are shown in FIG. 13 when the excitation light wavelength was changed for the samples and emissions of 625 nm from the samples were monitored.

The peak wavelength of the excitation light in the PLE measurement shifts to the long wavelength side from 365 nm of the peak wavelength of the excitation light for $CuAlS_2$:Mn. As the content of Ga increases, the luminous intensity from the fluorescent substances reduces, but the shift of the peak wavelength of the excitation light to the long wavelength side increases.

From the result, the fluorescent substances of $Cu(Al_{1-x}Ga_x)(S_{1-y}Se_y)_2$:Mn, Si and the like in which the luminescence centers Mn are activated are improved in crystallinity and emission characteristics by the flux effect of Si. When $CuAlS_2$:Mn, Si is used, it is obvious that by setting the Mn content of about 10 mol % and the Si content of about 20 mol %, red emission having a high luminous intensity with favorable color purity with a luminous peak wavelength of 629 nm or the like is shown. It can be assumed that Si and Mn are involved in the fluorescence emitting mechanism with respect to the wavelength of peak of excitation light shift, intensity of the fluorescence from the fluorescent substance and its wavelength of peak shift.

The fluorescent substance of the present invention is useful since it has high luminous intensity of fluorescence and can be favorably used for lighting devices using light emitting diodes and electroluminescence elements, fluorescent lamps such as a cold cathode fluorescent lamp and a hot electrode fluorescent lamp, and light emitting devices such as a field emitting display (FED) and a vacuum fluorescent display (VFD).

What is claimed is:

1. A fluorescent substance expressed by composition formula (1), $$Cu(Al_{1-x}Ga_x)(S_{1-y}Se_y)_2:Mn,Si \quad (1)$$

(where x represents a number satisfying $0 \leq x \leq 0.4$, and y represents a number satisfying $0 \leq y \leq 0.4$), including manganese as a luminescence center atom and silicon in the range of 5 mol % to 50 mol %, both values inclusive.

2. The fluorescent substance according to claim 1, wherein said fluorescent substance is a $CuAlS_2$:Mn,Si fluorescent substance.

3. A light emitting device, comprising the fluorescent substance of claim 1.

4. A light emitting device, comprising the fluorescent substance of claim 2.